Figure 1:
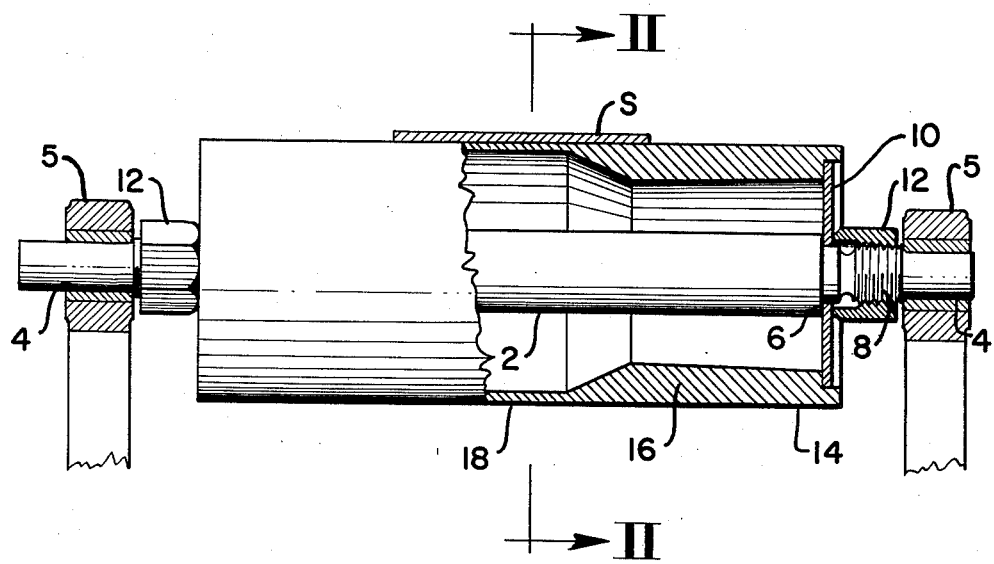

May 4, 1954 A. TEPLITZ 2,677,541
APPARATUS FOR AUTOMATICALLY CENTERING MOVING OBJECTS
Filed Jan. 16, 1952

INVENTOR.
ALFRED TEPLITZ
BY Donald G. Dalton
HIS ATTORNEY

Patented May 4, 1954

2,677,541

UNITED STATES PATENT OFFICE 2,677,541

APPARATUS FOR AUTOMATICALLY CENTERING MOVING OBJECTS

Alfred Teplitz, Pittsburgh, Pa., assignor to United States Steel Corporation, a corporation of New Jersey Application January 16, 1952, Serial No. 266,621

3 Claims. (Cl. 271—2.6)

This invention relates to apparatus for automatically centering moving objects, especially strip and strip-like materials. In the processing of metal strip, the strip is conveyed over rolls in the uncoiled condition. When the strip is conveyed over a roll to the processing equipment it is likely that the strip will be fed at a slight angle to the roll. Because of this, the strip will work its way across the face of the roll. In addition, the camber and/or lateral curvature which is present in the finished strip due to rolling difficulties causes the strip edges and longitudinal center line to approach the roll at an angle, this also causing the strip to move across the face of the roll. In order to keep the strip in the desired path of travel, various expedients have been resorted to. One of the most common is the use of stationary or rotatable side guides against which the edges of the strip bear. In some instances side guides have been used in conjunction with looper pits to force the strip back on the desired center line. The use of abnormally high strip tension has also been tried in an attempt to keep the strip aligned. Another method of operation is to periodically slip or slue the strip back into its approximate proper position on the conveying roll. All of the above methods of centering strip tend to abrade and mutilate the strip edges and in some instances cause the edges of the strip to be stretched beyond the elastic limit of the metal. Diagonal or lateral surface scratches are also formed on finely finished flat products of all kinds, these scratches being detrimental to subsequent operations and together with edge damage result in the scrapping of a large percentage of the material being processed. The problems discussed above also exist in belt conveyors and drive belts used in conjunction with belt pulleys. If the belt is made of rubber or other relatively soft material, it is more easily damaged. In addition to the methods of aligning strip mentioned above, crown rolls have been used to center materials having a low modulus of elasticity such as textiles, rubber and composition belts.

Several types of apparatus for centering and aligning strip are shown in the copending applications of Lorig, entitled "Apparatus for Positioning Strip," Serial No. 97,218, filed June 4, 1949, now Patent No. 2,593,157, and "Method and Apparatus for Positioning Strip," Serial No. 138,389, filed January 13, 1950, now Patent No. 2,592,581. While this apparatus has proved to be highly successful, the rolls of such apparatus have a crack or peripheral opening therein which is undesirable when handling paper, cellophane and similar strip-like materials where dimensional inequalities between the two parts of the roll may mar the material being processed. The crack is also undesirable in food processing and chemical applications where passage of liquids, grease, etc., into and out of the roll interior can not be tolerated.

It is therefore an object of the present invention to provide apparatus for automatically centering moving objects in which the outer surface of the conveying apparatus has a continuous body.

Figure 2:
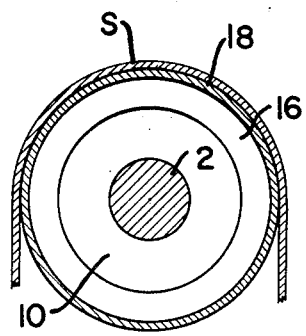

This and other objects will be more apparent after referring to the following specification and attached drawings, in which:

Figure 1 is a transverse view, partly in section, of the roll of my invention without full load being applied thereto; and Figure 2 is a sectional view taken on the line II—II of Figure 1.

Referring more particularly to the drawings, the reference numeral 2 indicates a steel shaft mounted in bearings 4 which are supported by the housing 5. The shaft 2 is reduced in diameter at each end to provide a shoulder 6. A threaded portion 8 is provided adjacent each shoulder 6 between the shoulder and the bearing 4. A steel disk or web portion 10 surrounds the shaft 2 adjacent each end and bears against the shoulder 6. The disk 10 is held in place by means of a nut 12 threaded onto the threaded portion 8. A hollow rotatable rim portion 14 surrounds the shaft 2 and is held in spaced relationship therefrom by means of the disks 10 which are fastened to each end thereof. The rim portion 14 has a relatively thick and rigid wall portion 16 adjacent each web 10. A relatively thin wall portion 18 connects the portions 16. The thin wall portion 18 preferably has a length approximately 20% of the total length of the rim portion as shown.

The operation of this roll is similar to that shown in the copending Lorig application, Serial No. 145,648, filed February 23, 1950, now Patent No. 2,593,158. The roll body may be considered as a simple beam, uniformly loaded and supported at its ends. As shown in the drawings, the web 10 and the wall portion 18 are relatively thin and the remainder of the roll body is relatively heavy. Under load of a strip S passing therearound under tension, the thin center portion 18 assumes an approximately circular elastic curve (not shown) while the relatively heavy outer portions of the roll remain almost straight.

Thus, the elastic curve of the roll is roughly V-shaped, the V being very flat since the angle of the V may be extremely small, such as a fraction of a second. Having assumed this V shape, the two halves of the roll are in the same relative position as the two halves of the rolls shown in the above mentioned Lorig copending application. In other words, a planar action results which will cause the strip S to remain centered or if it is off center the forces are such that they will move the strip back into centered position.

While one embodiment of my invention has been shown and described it will be apparent that other adaptations and modifications may be made without departing from the scope of the following claims.

I claim:

1. A roll for automatically centering an elongated object having a flat base in contact with the roll comprising a hollow rotatable rim portion and a web portion supporting each end of the rim portion, said rim portion having a relatively thick and rigid wall attached to each web portion extending inwardly toward the center of the roll a substantial distance from said web and a relatively thin wall connecting said thick walls, said thin wall portion being of less width than the base of the object and being free to deflect under load of the object passing thereover.

2. A roll for automatically centering an elongated object having a flat base in contact with the roll comprising a hollow rotatable rim portion and a relatively thin web portion supporting each end of the rim portion, said rim portion having a relatively thick and rigid wall attached to each web portion extending inwardly toward the center of the roll a substantial distance from said web and a relatively thin wall connecting said thick walls, said thin wall portion being of less width than the base of the object and being free to deflect under load of the object passing thereover, the relatively thin wall having a length approximately 20% of the total length of the rim portion.

3. A roll for automatically centering an elongated object having a flat base in contact with the roll comprising a rotatable shaft, a hollow rotatable rim portion surrounding said shaft, and a relatively thin web portion extending between each end of the rim portion and said shaft and supporting said rim portion, said rim portion having a relatively thick and rigid wall attached to each web portion extending inwardly toward the center of the roll a substantial distance from said web and a relatively thin wall connecting said thick walls, said thin wall portion being of less width than the base of the object and being free to deflect under load of the object passing thereover.

References Cited in the file of this patent

UNITED STATES PATENTS

| Number | Name | Date |
|---|---|---|
| 1,347,333 | Houston | July 20, 1920 |
| 1,898,131 | Jordan | Feb. 21, 1933 |
| 2,151,048 | Rowe | Mar. 21, 1939 |

FOREIGN PATENTS

| Number | Country | Date |
|---|---|---|
| 225,376 | Great Britain | Dec. 4, 1924 |